(12) United States Patent
Vodhanel

(10) Patent No.: US 6,347,008 B1
(45) Date of Patent: Feb. 12, 2002

(54) OPTICAL AMPLIFIER SYSTEM AND OPTICAL NETWORK HAVING FLATTENED GAIN AND CONSTANT PER CHANNEL OUTPUT POWER

(75) Inventor: Richard S. Vodhanel, Red Bank, NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/332,131

(22) Filed: Jun. 14, 1999

(51) Int. Cl.[7] .................................................. H01S 3/00
(52) U.S. Cl. ..................................................... 359/337.4
(58) Field of Search ................................. 359/333, 337, 359/341, 290, 321, 337.1, 337.11, 337.12, 337.13, 337.2, 337.21, 337.22, 337.3, 337.4, 337.5, 341.1, 341.2, 341.31, 341.32, 341.33, 341.4, 341.41, 341.43, 341.44, 341.45; 372/29.022, 6, 94

(56) References Cited

U.S. PATENT DOCUMENTS

| | | | |
|---|---|---|---|
| 5,088,095 A | * 2/1992 | Zirngibl | 372/6 |
| 5,117,196 A | * 5/1992 | Epworth et al. | 359/333 |
| 5,128,800 A | * 7/1992 | Zirngibl | 359/341 |
| 5,155,780 A | * 10/1992 | Zirngibl | 385/27 |
| 5,239,607 A | * 8/1993 | da Silva et al. | 385/122 |
| 5,598,491 A | * 1/1997 | Ohya et al. | 385/24 |
| 5,872,649 A | * 2/1999 | Byron et al. | 359/341 |
| 5,991,068 A | * 11/1999 | Massicott et al. | 359/337 |
| 6,055,092 A | * 4/2000 | Sugaya et al. | 359/337 |

FOREIGN PATENT DOCUMENTS

WO    WO 98/06191    2/1998    .......... H04B/10/17

OTHER PUBLICATIONS

Jackel, J.L., et al., "All–optical stabilization of cascaded multichannel erbium–doped fiber amplifiers with changing numbers of channels", *Technical Digest of the Optical Fiber Communication Conference* 1997, OSA Technical Digest Series, vol. 6, pp. 84–85 (1997).

Park, S.Y., et al., "Accurate Control Of Output Power Level in Gain–Flattened EDFA With Low Noise Figure", *Proceedings of the 11th Conference on Integrated Optics and Optical Fibre Communications—23rd European Conference on Optical Communications* (IOOC–ECOC 97), Conf. Publ. No. 448, vol. 3, pp. 43–46.

* cited by examiner

*Primary Examiner*—Thomas H. Tarcza
*Assistant Examiner*—Deandra Hughes
(74) *Attorney, Agent, or Firm*—Morgan, Lewis & Bockius LLP

(57) ABSTRACT

An optical network and an optical amplifier system provide flattened gain, constant per channel output power, and compensation for variable span losses. The optical amplifier system is disposed in a transmission line of the optical network. The optical amplifier includes a first and second stage optical feedback loop amplifiers.

40 Claims, 5 Drawing Sheets

OPTICAL AMPLIFIER SYSTEM AND OPTICAL NETWORK HAVING FLATTENED GAIN AND CONSTANT PER CHANNEL OUTPUT POWER

BACKGROUND OF THE INVENTION

1. Field of the Invention

The present invention relates to an optical fiber network, and more particularly, to a gain flattened multi-stage optical amplifier system for an optical fiber network.

2. Discussion of the Related Art

In a long distance optical fiber network, optical power signals generally decrease with distance so that it is usually necessary to use in-line amplifiers to boost the optical signal power levels. To provide in-line amplification, erbium-doped fiber amplifiers (EDFAs) are most commonly employed. In a multichannel optical system, gain flattened amplifiers are desired so that each channel maintains substantially the same optical power and optical signal to noise ratio. Furthermore, flat gain characteristics together with constant output power are desired despite variable span losses. That is, the amplified signal power levels should be constant even when signal losses vary over the distances between adjacent amplifiers.

EDFAs typically have flat gain from about 1547 nm to 1559 nm when pumped to achieve an average inversion level of 70%. Flat gain operation from 1525 to 1565 nm can be achieved by adding gain flattening filters. However, the flat gain characteristics degrade with input power variations as the number of WDM channels and/or span losses change.

S. Y. Park et al. in "Accurate Control of Output Power Level in Gain-Flattened EDFA with Low Noise Figure" *Proceedings of the 11th Conference on Integrated Optics and Optical Fibre Communications—23rd European Conference on Optical Communications* (IOOC-ECOC '97), No. 448, Vol. 3, pp. 43–46 (1997) describe a system that addresses these problems as shown in FIG. 5 of this specification. As shown in FIG. 5, the system of Park et al. uses two stage EDFA having EDFA optical amplifiers EDF1 and EDF2. However, to achieve a constant total gain, the amplification of each EDFA optical amplifier EDF1 and EDF2 is maintained by controlling the associated pump laser power. That is, the amount of laser pump power for each stage is increased or decreased as the total input power is increased or decreased. To accomplish this, the input signal power to each section is tapped using signal taps T to be monitored by the associated control part C. Then, the control part C, having a pump laser, provides pumping power to the associated EDFA optical amplifier section through the couplers W in accordance with the monitored signal powers. In addition, FIG. 5 shows filter F which removes undesired wavelengths and isolators I that eliminate backward traveling light. Also, the Optical Supervisory Channel (OSC) power is measured using wavelength selective coupler W2 and controller C2. The received OSC power level is used to adjust the voltage controlled attenuator VCA to maintain constant per channel output power levels, for a wide range of span loss variations.

The system of Park et al. suffers from a number of limitations and drawbacks. For example, this pump control scheme has limited dynamic range due to unstable operation at low pump powers. In addition, the control parts C must actively adjust the laser pumping power. As a result, the electronics that provide monitoring, feedback and control are both cumbersome and expensive. Furthermore, successful constant gain of the twostage optical amplifier of FIG. 5 relies upon the continuous, reliable operation of the control parts C.

SUMMARY OF THE INVENTION

Accordingly, the present invention is directed to an optical amplifier system that substantially obviates one or more of the problems due to limitations and disadvantages of the related art.

An object of the invention is to provide a multi-stage optical amplifier system that has flat gain and constant output per channel in a multichannel optical fiber network.

Another object of the present invention is to provide a two-stage optical amplifier system that is inexpensive and uncomplicated to manufacture and operate.

Another object of the present invention is to provide a two-stage optical amplifier system that provides constant gain for each section without the need for active control.

Another object of the present invention is to provide an optical amplifier system that compensates for variable span losses.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical network includes a transmission line; a first wavelength division multiplexer for receiving N optical signals each at a different wavelength and for multiplexing together the N optical signals, and for outputting the multiplexed signal to the transmission line; at least one optical amplifier system disposed in the transmission line, the optical amplifier system including a first stage optical feedback loop amplifier defining a first optical feedback wavelength and a second stage optical feedback loop amplifier defining a second optical feedback wavelength; and a second wavelength division multiplexer for receiving and demultiplexing the multiplexed signal from the transmission line.

In another aspect, a two-stage optical amplifier system for amplifying optical signals between first and second portions of a transmission line includes a first optical amplifier having an input coupled with the first portion of the transmission line and an output; a first feedback loop coupled with the input and the output of the first optical amplifier, the first feedback loop defining a first optical feedback wavelength; a second optical amplifier having an input coupled with the output of the first optical amplifier and an output coupled with the second portion of the transmission line; and a second feedback loop coupled with the input and the output of the first optical amplifier, the second feedback loop defining a second optical feedback wavelength.

In another aspect, an optical network includes a transmission line having first and second ends; a transmitting terminal for outputting light to the first end of the transmission line, the light having N wavelengths each corresponding to wavelengths of the multichannel signal and one wavelength different than the N wavelengths, the N +1 wavelengths of light having a predetermined total power; and a line amplifier for receiving light from the second end of the transmission line, detecting the total power of the received light, amplifying the received light to a power level equal to the predetermined total power, and retransmitting the amplified received light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
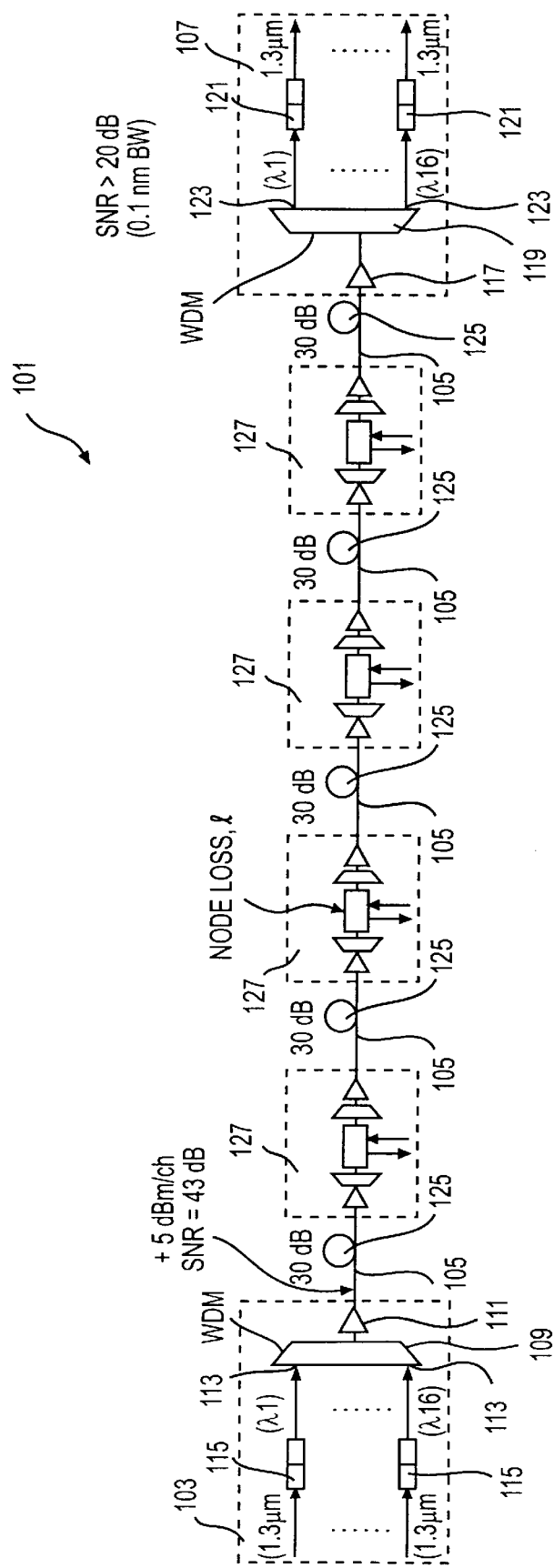
FIG. 1 is a schematic diagram of an optical fiber network having optical amplifier systems according to an embodiment of the present invention.

FIG. 1 shows a schematic diagram of an optical fiber network having optical amplifier systems according to an embodiment of the present invention.

Generally, a optical fiber network 101 comprises a transmitting terminal 103, a transmission line 105, and a receiving terminal 107. Alternatively, the system may be part of a mesh network, a ring network, an add/drop linear chain, or other network configuration. Of course, the terminals 103, 107 may each operate for both transmission and receiving using a two direction transmission line or a pair of transmission lines. Also, the transmission line 105 may include one or more optical fibers or optical fiber segments. The transmission terminal 103 provides a number of optical signals (or channels), each at a distinct wavelength. Any number of channels may be used, for example, 16 or 32 channels. While any wavelength band may be selected, a preferred wavelength band would be 1525 nm to 1562 nm. In the depicted configuration, the signal-to-noise ratios would be kept greater than 20 dB as measured in a bandwidth of 0.1 nm. Accordingly, in one configuration, an output signal from the transmission terminal 103 has a signal-to-noise ratio of 43 dB at +5 dBm/ch. Of course, other signal wavelengths, bandwidth, and signal-to-noise ratios may be employed in embodiments according to the present invention.

In a typical configuration, the transmission terminal 103 includes a wavelength division multiplexer (WDM) 109 and an optical amplifier 111. While other types of components may be employed, an exemplary WDM 109 would be a Piri Model AWG-1X32-100G-1.5-M-SC-NT WDM, and an exemplary optical amplifier 111 would be a Lucent Technologies Model 1724CJDAD amplifier. The WDM 109 receives a plurality of optical signals from a plurality of corresponding inputs 113. Here, each of the optical signals are provided at a wavelength corresponding to one of the channels of the optical fiber network 101. The WDM 109 multiplexes the plurality of optical signals together to be output to the transmission line 105 through the optical amplifier 111.

As described above, each input 113 of the WDM 109 receives optical signals, each at a wavelength corresponding to a particular channel. However, the optical signals may not be directly provided at separate wavelengths corresponding to particular channels. Instead, a plurality of optical signals may be provided at a single wavelength as shown in FIG. 1. Therefore, each optical signal is wavelength converted to one of the system wavelengths using a converter 115. Similarly, if signals are provided as electrical signals, the signals can be electro-optically converted. The signals can be provided as OC-48 signals.

The receiving terminal 107 of FIG. 1 operates in a generally reversed manner as the transmission terminal 103. Accordingly, a preferred receiving terminal 107 includes an amplifier 117 and a WDM demultiplexer 119. Further, FIG. 1 shows the receiving terminal including wavelength converters 121 coupled to outputs 123 of the WDM 119. Of course, configurations of the receiving terminal 107 can be varied, and any variations need not correspond with variations of the transmission terminal 103.

The transmission line 105 of FIG. 1 provides an optical transmission line having at least one optical amplifier 125. Optionally, the transmission line 105 may include a number of nodes 127. The amplification and spacing of the optical amplifiers 125 are selected to compensate for loss of signal strength through the transmission line 105. For example, in FIG. 1, the optical amplifiers 125 are two-stage optical feedback amplifiers having a total gain of 30 dB.

Figure 2:
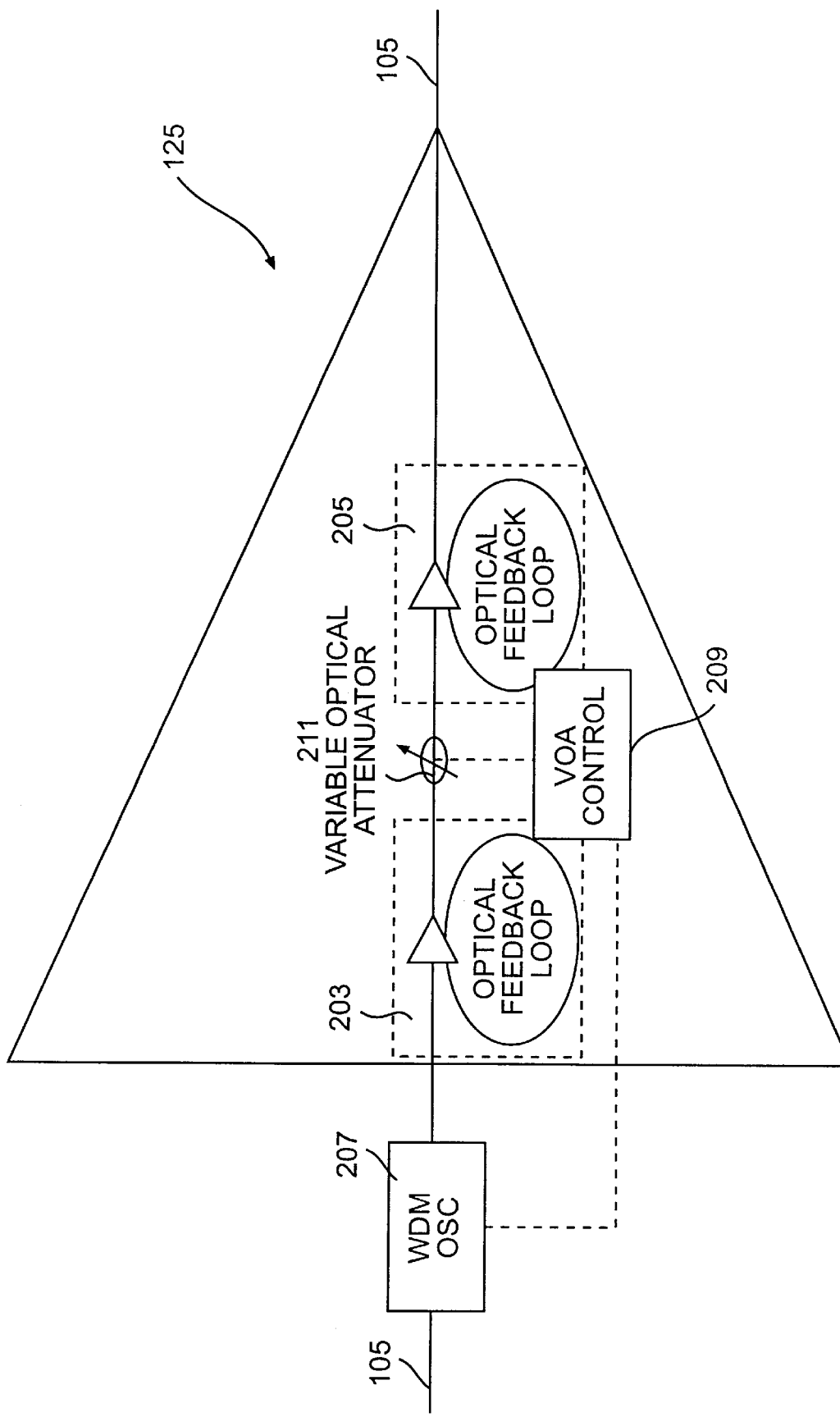
FIG. 2 is a schematic diagram of a two-stage optical amplifier system according to an embodiment of the present invention.

The optical amplifiers 125 will now be described in detail. FIG. 2 shows a two-stage optical amplifier system according to an embodiment of the present invention. While not shown, the two-stage optical amplifier system may of course be coupled with additional amplifiers in a multi-stage amplifier system.

The optical amplifier 125 comprises a first stage feedback loop optical amplifier 203 and a second stage feedback loop optical amplifier 205. Optionally, the optical amplifier may include a WDM filter 207 to demultiplex the OSC light, and a variable optical attenuator controller 209 to monitor the received OSC signal power and to control a variable optical 211 to adjust the total gain. The first and second stage feedback loop optical amplifiers 203, 205 may include erbium-doped fiber amplifiers with laser optical pumping. While not shown, isolators and filters may be coupled to the outputs and inputs of the first and second stage optical amplifiers 203, 205 to block the ring laser light or other undesired wavelengths. In this manner, crosstalk can be eliminated between the first and second stage optical amplifiers 203, 205 or between adjacent optical amplifiers 125. Any suitable type feedback loop optical amplifiers 203, 205 may be utilized such as those described in PCT Published Patent Application No. WO98/06191 to Jackel and U.S. Pat. No. 5,088,095 to Zirngibl which are hereby incorporated by reference. As will be explained below, the feedback loop operates as a ring laser to provide fixed gain operation with a fixed energy.

Figure 3:
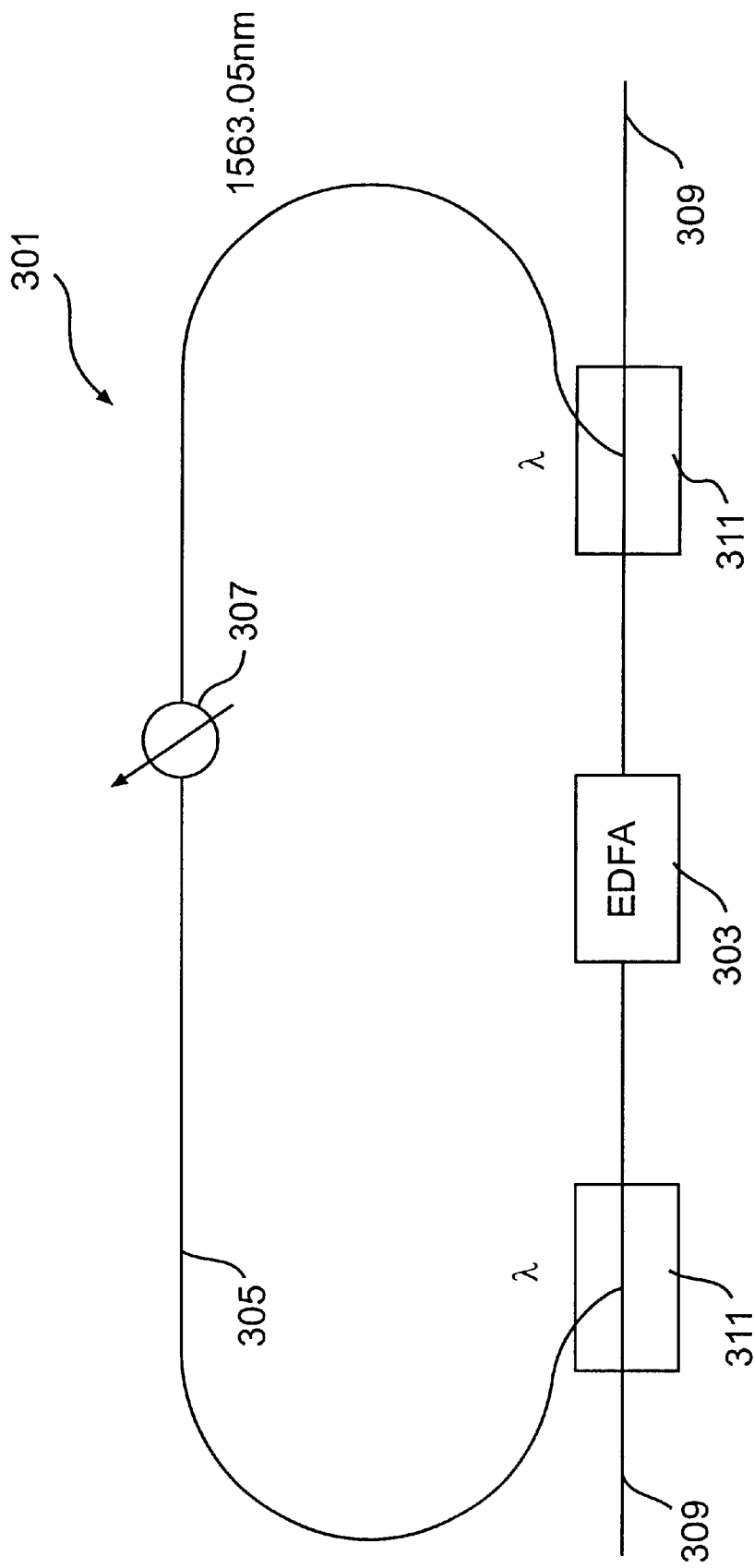
FIG. 3 is a schematic diagram showing the configuration of one stage of a two-stage optical amplifier system according to a preferred configuration.

A preferred feedback loop optical amplifier will now be described with reference to FIG. 3. FIG. 3 shows a schematic diagram showing the configuration of one stage of a two-stage optical amplifier system according to a preferred configuration. In general, both stages may be configured similarly.

As shown in FIG. 3, the feedback loop optical amplifier 301 includes an erbium-doped fiber amplifier (EDFA) 303, a feedback line 305, and a variable optical attenuator 307. The feedback fiber is coupled to the transmission line 309 by couplers 311. Preferably, the couplers 311 are wavelength-selective couplers such as WDM couplers that select only a specific wavelength to be directed to the feedback fiber 305.

Here, the feedback wavelength should be different than the wavelength of any signal channel. In the configuration shown, the feedback wavelength may be 1563.05 nm. While other components may be selected, a suitable coupler 311 is ETEK Model DWF12000-18-3-1. The variable optical attenuator 307 may be used to set the gain of the feedback loop optical amplifier.

The operation of the feedback loop optical amplifier 301 will now be explained in detail. The EDFA 303 is optically pumped using a pump laser (not shown) operating at a wavelength of 980 nm or 1490 nm, for example, so that the population state of the erbium ions is inverted. In this manner, an optical signal traveling through the EDFA 303 will absorb energy via stimulated emission, thereby becoming amplified. Moreover, the feedback fiber 305 forms a ring laser. As a result, if one channel of the signal turns off, the corresponding energy will be deposited into the lasing of the ring laser, thereby achieving constant gain. Here, the variable attenuator 307 is preferably set so that lasing is just achieved with all signal channels on. In this manner, lasing will be present in the feedback fiber 305 at any operational number of signal channels.

In selecting feedback loop optical amplifiers for the first and second stages 203, 205, it is desirable to select feedback loop optical amplifiers having complementary shaped gain profiles. For example, it would be desirable to match feedback loop optical amplifiers having oppositely shaped gain profiles such as a positive sloping profile with a negative sloping profile. With the optical amplifier configuration described above, an optical fiber network utilizes a two-stage amplifier having a wider flat gain wavelength region. In addition, the present configuration achieves the superior characteristics, such as low noise figure, of a two-stage amplifier. Moreover, the optical amplifier described herein also achieves flat, constant gain without the complexity required to constantly adjust the laser pump power.

Figure 4:
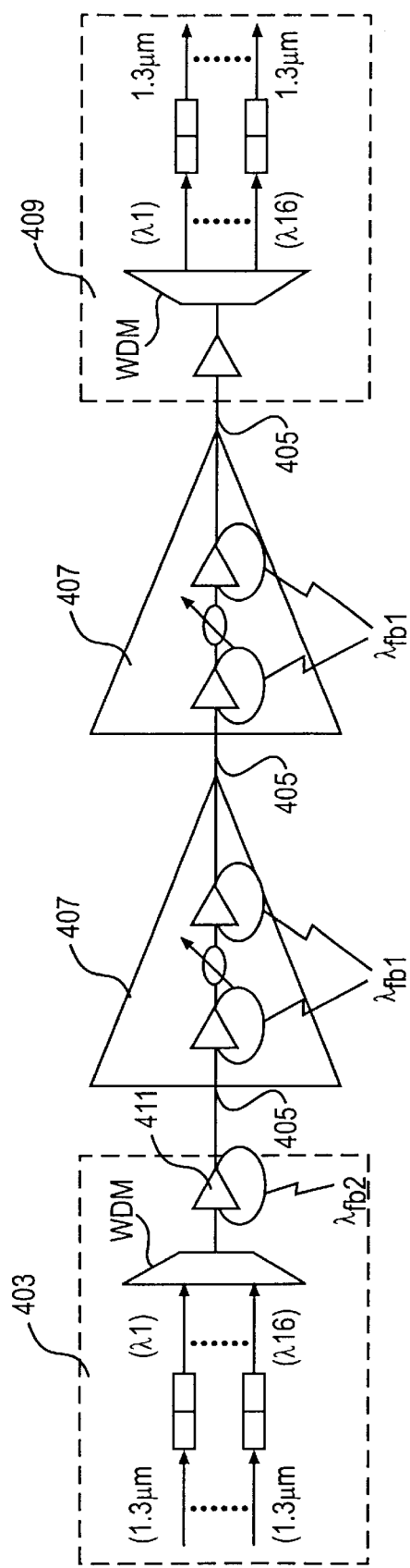
FIG. 4 is a schematic diagram of an optical fiber network having optical amplifier systems according to another embodiment of the present invention.
Figure 5:
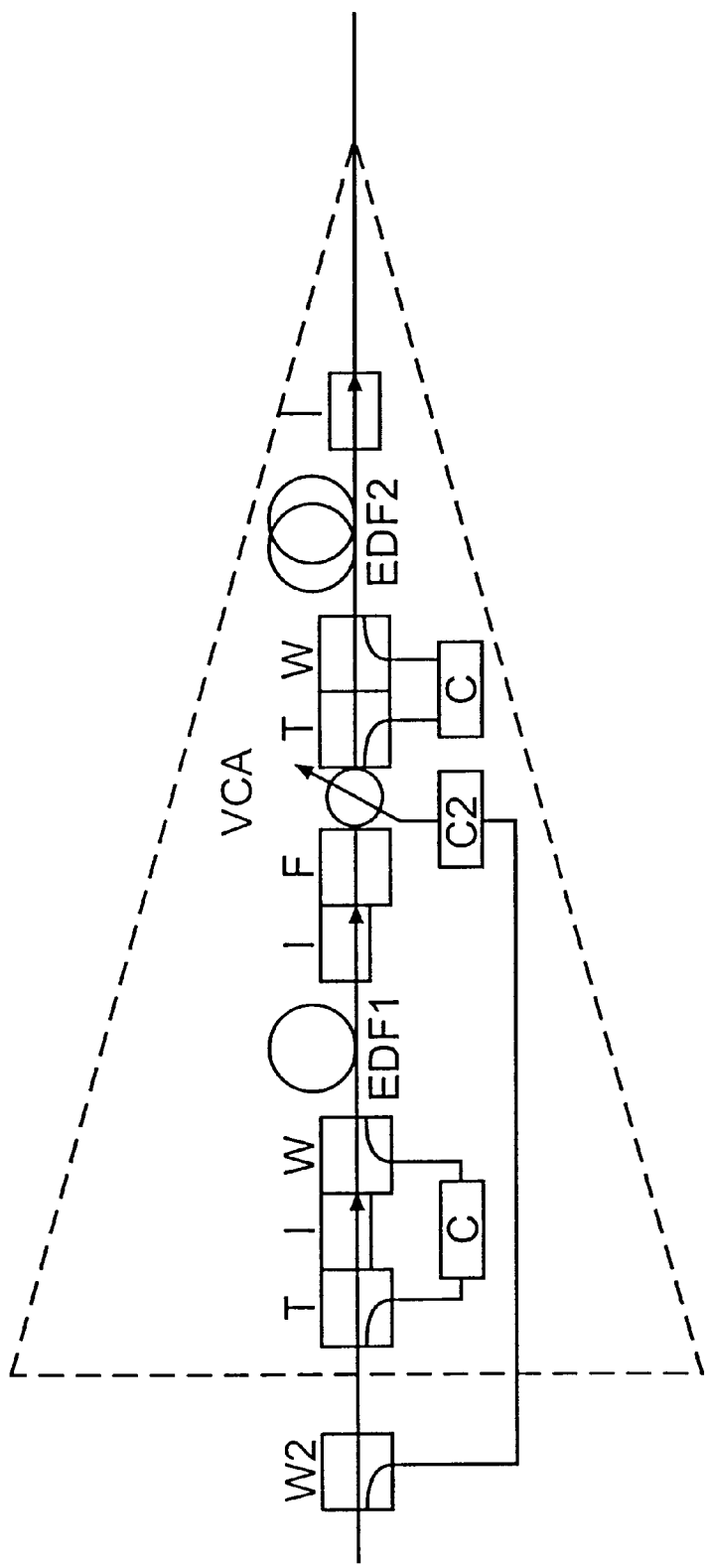
FIG. 5 is a schematic diagram according to a conventional two-stage gain-flattened optical amplifier.

FIG. 4 shows an optical fiber network having optical amplifier systems according to another embodiment of the present invention that compensates for variable span losses.

As shown in FIG. 4, the optical fiber network is configured generally similar to the network of FIG. 1 and includes a transmitting terminal 403, a transmission line 405, at least one optical amplifier 407, and a receiving terminal 409. Here, the at least one optical amplifier 407 is preferably a two-stage feedback loop optical amplifier as described above. In addition, the feedback loops of the at least one optical amplifier system 407 operate at a wavelength $\lambda_{fb1}$. However, the amplifier 411 of the transmitting terminal 409 is a feedback loop optical amplifier wherein the feedback loop operates at a wavelength $\lambda_{fb2}$ which is different than $\lambda_{fb1}$. Here, the amplifier 411 is shown as a one-stage amplifier, but a two-stage amplifier or other amplifier system having constant output power may be utilized.

In the operation of the optical fiber network of FIG. 4, up to N signal channels are multiplexed together by the WDM 413 and amplified by the amplifier 411 to be carried by the transmission line 405. In addition, ring laser light at the feedback loop wavelength $\lambda_{fb2}$ is also transmitted on the transmission line 405. As discussed above, the feedback loop optical amplifier 411 maintains constant signal output power because the energy associated with a signal channel is incorporated into or out of the ring laser light when any signal channel is turned off or on. Thus, the total output of optical power from the feedback loop optical amplifier 411 including the ring laser light remains constant. That is, the output power of the N signal channels plus the ring laser output is constant.

As a result, the total output optical power of the N +1 wavelengths can be calibrated to a predetermined value. Then, the line amplifiers can compensate the gain for variable span losses. Such compensation mechanisms can be implemented using any appropriate system such as the WDM filter and VOA controller of FIG. 2 to monitor the total OSC power output and adjust the gain of the amplifier using the variable optical attenuator. Accordingly, the optical power of the N +1 wavelengths can be restored to the predetermined value. Generally, the line amplifiers 407 treat any light at a wavelength $\lambda_{fb2}$ as a quasi-signal.

In the above described operation, variable span losses are easily and reliably corrected. Also, fast complex electronics are not needed since span losses vary slowly. In addition, the calibration can be done on a one time basis at installation. Alternatively, the monitoring/readjusting can be implemented manually or automatically to regularly recalibrate system performance.

It will be apparent to those skilled in the art that various modifications and variations can be made in the optical amplifier system of the present invention without departing from the spirit or scope of the invention. Thus, it is intended that the present invention cover the modifications and variations of this invention provided they come within the scope of the appended claims and their equivalents.

What is claimed is:

1. An optical network comprising,
    a transmission line;
    a first wavelength division multiplexer for receiving N optical signals each at a different wavelength and for multiplexing together the N optical signals, and for outputting the multiplexed signal to the transmission line;
    at least one optical amplifier system disposed in the transmission line, the optical amplifier system including a first stage optical feedback loop amplifier defining a first optical feedback wavelength and a second stage optical feedback loop amplifier defining a second optical feedback wavelength; and
    a second wavelength division multiplexer for receiving and demultiplexing the multiplexed signal from the transmission line,
    wherein substantially all signal power output from the first stage optical feedback loop amplifier is received by the second stage optical feedback loop amplifier.

2. The optical network according to claim 1, wherein the first stage optical feedback loop amplifier includes a first optical amplifier having an input coupled with the transmission line to receive the multiplexed signal and an output, and a first feedback loop coupled between the input and the output of the first optical amplifier, and
    wherein the second stage optical feedback loop amplifier includes a second optical amplifier having an input coupled with the output of the first optical amplifier and an output coupled with the transmission line to retransmit the multiplexed signal following amplification, and a second feedback loop coupled between the input and the output of the second optical amplifier.

3. The optical network according to claim 1, wherein the first feedback loop and the first optical amplifier form a first ring laser operating at the first optical feedback wavelength and wherein the second feedback loop and the second optical amplifier form a second ring laser operating at the second optical feedback wavelength.

4. The optical network according to claim 2, wherein the first feedback loop is coupled to the input and the output of the first optical amplifier using wavelength selective couplers, and wherein the second feedback loop is coupled to the input and the output of the second optical amplifier using wavelength selective couplers.

5. The optical network according to claim 1, wherein the output signal power of the first stage optical feedback loop amplifier is significantly less than the output signal power of the second stage optical feedback loop amplifier.

6. The optical network according to claim 1, wherein the first and second optical feedback wavelengths are the same.

7. The optical network according to claim 6, wherein the first and second optical feedback wavelengths equal about 1563.05 nm.

8. The optical network according to claim 1, further comprising a WDM filter to demultiplex an optical service channel (OSC) received by the input of the first stage optical feedback loop amplifier, a variable attenuator controller to monitor OSC signal power, and a variable optical attenuator to adjust a total gain of the first and second stage optical feedback loop amplifiers.

9. The optical network according to claim 1, wherein the N optical signals are defined in an operational wavelength band of 1525 nm to 1562 nm.

10. The optical network according to claim 1, wherein a total gain of the first and second stage optical feedback loop amplifiers is substantially flat in an operational wavelength band.

11. The optical network according to claim 1, wherein a gain per channel of the first and second stage optical feedback loop amplifiers remains constant as a number of signal channels changes.

12. The optical network according to claim 1, wherein the first stage optical feedback loop amplifier defines a first gain profile and the second stage optical feedback loop amplifier defines a second gain profile complementary to the first gain profile.

13. The optical network according to claim 12, wherein one of the first and second stage optical feedback loop amplifiers has a positive sloping gain profile and the other one of the first and second stage optical feedback loop amplifiers has a negative sloping gain profile.

14. The optical network according to claim 1, further comprising an output amplifier coupled to the wavelength division multiplexer, the wavelength division multiplexer outputting the multiplexed signal to the transmission line through the output amplifier.

15. The optical network according to claim 14, wherein the output amplifier includes an optical amplifier and a feedback loop.

16. The optical network according to claim 15, wherein the optical amplifier and the feedback loop of the output amplifier form a third ring laser operating at a third optical feedback wavelength different than the first and second optical feedback wavelengths.

17. The optical network according to claim 16, wherein ring laser radiation of the output amplifier is transmitted through the transmission line together with the multiwavelength signal.

18. The optical network according to claim 17, wherein a total power of the multiplexed signal and the ring laser radiation output from the output amplifier remains at a predetermined power level even as the number of channels input to the wavelength division multiplexer changes.

19. The optical network according to claim 18, wherein a total power of the first and second stage optical feedback loop amplifiers is controlled so that a total power of the multiplexed signal and the ring laser radiation retransmitted by the second stage optical feedback loop amplifier is substantially equal to the predetermined power level.

20. The optical network according to claim 17, wherein a total power of the multiplexed signal and the ring laser radiation output from the third optical amplifier remains at a predetermined power level even as the span loss of the transmission line changes.

21. A two-stage amplifier system for amplifying optical signals between first and second portions of a transmission line, comprising:
    a first optical amplifier having an input coupled with the first portion of the transmission line and an output;
    a first feedback loop coupled with the input and the output of the first optical amplifier, the first feedback loop defining a first optical feedback wavelength;
    a second optical amplifier having an input coupled with the output of the first optical amplifier and an output coupled with the second portion of the transmission line;
    a second feedback loop coupled with the input and the output of the first optical amplifier, the second feedback loop defining a second optical feedback wavelength; and
    a WDM filter to demultiplex an optical service channel (OSC) signal received from the first portion of the transmission line, a variable optical controller to monitor OSC signal power, and a variable optical attenuator to adjust the total gain of the two-stage amplifier system under control of the variable optical controller.

22. The two-stage amplifier system according to claim 21, wherein the first and second optical feedback wavelengths are the same.

23. The two-stage amplifier system according to claim 22, wherein the first and second optical feedback wavelengths equal about 1563.05 nm.

24. The two-stage amplifier system according to claim 22, wherein the first feedback loop and the first optical amplifier form ring laser operating at the first optical feedback wavelength, and wherein the second feedback loop and the second optical amplifier form ring laser operating at the second optical feedback wavelength.

25. The two-stage amplifier system according to claim 22, wherein the first feedback loop and the first optical amplifier form ring laser operating at the first optical feedback wavelength, and wherein the second feedback loop and the second optical amplifier form ring laser operating at the second optical feedback wavelength.

26. The two-stage amplifier system according to claim 21, wherein the optical signals are defined in an operational wavelength band between 1525 nm and 1562 nm.

27. The two-stage amplifier system according to claim 21, wherein the total gain of the two-stage amplifier system is substantially flat in an operational wavelength band.

28. The two-stage amplifier system according to claim 21, wherein the optical signals are multiplexed together on the transmission line.

29. The two-stage amplifier system according to claim 21, wherein a gain per channel remains constant as a number of signal channels changes.

30. The two-stage amplifier system according to claim 21, wherein the first feedback loop is coupled to the input and output of the first optical amplifier using wavelength selective couplers, and wherein the second feedback loop is coupled to the input and output of the second optical amplifier using wavelength selective couplers.

31. The two-stage amplifier system according to claim 21, wherein the first optical amplifier defines a first gain profile and the second optical amplifier defines a second gain profile complementary to the first gain profile.

32. The two-stage amplifier system according to claim 21, wherein one of the first and second optical amplifiers has a positive sloping gain profile and the other one of the first and second optical has a negative sloping gain profile.

33. An optical network for transmitting a multichannel signal, comprising:

a transmission line having first and second ends;

a transmitting terminal for outputting light to the first end of the transmission line, the light having N wavelengths each corresponding to wavelengths of the multichannel signal and one wavelength different than the N wavelengths, the N+1 wavelengths of light having a predetermined total power; and a line amplifier for receiving light from the second end of the transmission line, detecting the total power of the received light, amplifying the received light to a power level equal to the predetermined total power, and retransmitting the amplified received light, wherein the transmitting terminal includes a feedback loop optical amplifier that forms a ring laser operating at an optical feedback wavelength equal to the control wavelength.

34. The optical network according to claim 33, wherein ring laser radiation of the feedback loop optical amplifier is transmitted through the transmission line together with the multichannel signal.

35. The optical network according to claim 34, wherein a total power of the multichannel signal and the ring laser radiation retransmitted from the feedback loop optical amplifier remains at the predetermined total power even as the number of active channels in the multichannel signal changes.

36. The optical network according to claim 34, wherein a total power of the multichannel signal and the ring laser radiation retransmitted from the feedback loop optical amplifier remains at the predetermined total power even as the span loss of the transmission line changes.

37. An optical network, comprising:

a transmission line;

a first wavelength division multiplexer for receiving N optical signals each at a different wavelength and for multiplexing together the N optical signals, and for outputting the multiplexed signal to the transmission line;

at least one optical amplifier system disposed in the transmission line, the optical amplifier system including a first stage optical feedback loop amplifier defining a first optical feedback wavelength and a second stage optical feedback loop amplifier defining a second optical feedback wavelength;

a second wavelength division multiplexer for receiving and demultiplexing the multiplexed signal from the transmission line; and a WDM filter to demultiplex an optical service channel (OSC) received by the input of the first stage optical feedback loop amplifier, a variable attenuator controller to monitor OSC signal power, and a variable optical attenuator to adjust a total gain of the first and second stage optical feedback loop amplifiers.

38. An optical network, comprising:

a transmission line;

a first wavelength division multiplexer for receiving N optical signal each at a different wavelength and for multiplexing together the N optical signals, and for outputting the multiplexed signal to the transmission line;

at least one optical amplifier system disposed in the transmission line, the optical amplifier system including a first stage optical feedback loop amplifier defining a first optical feedback wavelength and a second stage optical feedback loop amplifier defining a second optical feedback wavelength;

a second wavelength division multiplexer for receiving and demultiplexing the multiplexed signal from the transmission line; and an output amplifier coupled to the wavelength division multiplexer and including an optical amplifier and a feedback loop, the wavelength division multiplexer outputting the multiplexed signal to the transmission line through the output amplifier such that the optical amplifier and the feedback loop of the output amplifier form a third ring laser operating at a third optical feedback wavelength different than the first and second optical feedback wavelengths with the ring laser radiation of the output amplifier being transmitted through the transmission line together with the multiwavelength signal, wherein a total power of the multiplexed signal and the ring laser radiation output from the output amplifier remains at a predetermined power level even as the number of channels input to the wavelength division multiplexer changes.

39. The optical network according to claim 38, wherein a total gain of the first and second stage optical feedback loop amplifiers is controlled so that a total power of the multiplexed signal and the ring laser radiation retransmitted by the second stage optical feedback loop amplifier is substantially equal to the predetermined power level.

40. An optical network, comprising:

a transmission line;

a first wavelength division multiplexer for receiving N optical signals each at a different wavelength and for multiplexing together the N optical signals, and for outputting the multiplexed signal to the transmission line;

at least one optical amplifier system disposed in the transmission line, the optical amplifier system including a first stage optical feedback loop amplifier defining a first optical feedback wavelength and a second stage optical feedback loop amplifier defining a second optical feedback wavelength;

a second wavelength division multiplexer for receiving and demultiplexing the multiplexed signal from the transmission line; and an output amplifier coupled to the wavelength division multiplexer and including an optical amplifier and a feedback loop, the wavelength division multiplexer outputting the multiplexed signal to the transmission line through the output amplifier such that the optical amplifier and the feedback loop of the output amplifier form a third ring laser operating at a third optical feedback wavelength different than the first and second optical feedback wavelengths with the ring laser radiation of the output amplifier being transmitted through the transmission line together with the multiwavelength signal, wherein a total power of the multiplexed signal and the ring laser radiation output from the third optical amplifier remains at a predetermined power level even as the span loss of the transmission line changes.

* * * * *